United States Patent [19]

Hervey

[11] Patent Number: 4,766,030
[45] Date of Patent: Aug. 23, 1988

[54] OXONATED POLY(ALKYLENE OXIDE) SURFACE TREATMENT AGENTS

[76] Inventor: Laurence R. B. Hervey, P.O. Box 363, Wells River, Vt. 05081

[21] Appl. No.: 93,199

[22] Filed: Aug. 31, 1987

Related U.S. Application Data

[62] Division of Ser. No. 767,898, Aug. 21, 1985, Pat. No. 4,698,259.

[51] Int. Cl.$^4$ .......................... D04H 1/58; B05D 3/02; C03C 25/02; D21C 9/00
[52] U.S. Cl. ........................................ 428/289; 65/3.4; 106/286.5; 162/164.1; 162/182; 162/9; 252/8.9; 252/52 A; 252/174.21; 252/351; 252/8.554; 427/389.7; 427/389.8; 427/393.1; 428/290; 428/375; 428/392; 428/393; 428/403; 428/404
[58] Field of Search ............... 65/3.4, 344; 106/286.5; 162/9, 164.1, 182; 252/8.55 D, 8.9, 52 A, 174.21, 351; 427/389.7, 389.8, 393.1; 428/290, 289, 375, 392, 393, 403, 404

[56] References Cited

U.S. PATENT DOCUMENTS

| | | | |
|---|---|---|---|
| 3,040,413 | 6/1962 | Marzocchi et al. | 427/389.7 |
| 3,042,544 | 7/1962 | Marzocchi et al. | 427/389.7 |
| 3,476,589 | 11/1969 | Raphael | 65/3.44 |
| 3,499,823 | 3/1970 | Croon et al. | 162/164.1 |
| 3,674,632 | 7/1972 | Wennergren et al. | 162/164.1 |
| 4,121,966 | 10/1978 | Amano et al. | 162/164.1 |
| 4,303,471 | 12/1981 | Laursen | 162/158 |
| 4,305,781 | 12/1981 | Langley et al. | 162/164.1 |
| 4,340,382 | 7/1982 | Morlino et al. | 252/351 |
| 4,361,465 | 11/1982 | Graham | 162/156 |
| 4,410,447 | 10/1983 | Decker | 252/351 |
| 4,481,077 | 11/1984 | Herrick | 162/9 |
| 4,525,525 | 6/1985 | Höfer et al. | 252/351 |

FOREIGN PATENT DOCUMENTS 2081731 2/1982 United Kingdom ............. 427/393.1

OTHER PUBLICATIONS

Valko et al., "Curing Swollen Cotton at High Temperature", (1962), Textile Research Journal, pp. 331–337.
Valko et al., "Non-Reactive and Co-Reactive Additives in Cotton Cross-Linking", (1967), Textile Research Journal, pp. 253–263.
Harper et al., "Application of Mechanisms for Wet and Dry Wrinkle Recovery to Fabric Exhibiting the Unusual Combination of High Dry and Low Wet Recovery", (1968), Textile Research Journal, pp. 292–304.
Liggett et al., "Cross-Linked Cotton of High Moisture Regain", (1968), Textile Research Journal, pp. 375–387.
Harper et al., "Hydrophilic Polymer Grafting in Durable Press Finishing", (1978), Textile Chemist and Colorist, v. 2(1), pp. 37–41.
Vigo et al., "Temperature-Adaptable Hollow Fibers Containing Polyethylene Glycols", (1983), Journal of Coated Fabrics, vol. 12, pp. 243–254.

Primary Examiner—Thurman K. Page
Attorney, Agent, or Firm—Sutherland, Asbill & Brennan

[57] ABSTRACT

An oxonated poly (alkylene oxide) substantially devoid of hydrocarbon chains of 5 or more carbon atoms is used to treat substances bearing negative electrostatic charges, so as to reduce such charges without rendering the substance hyrophobic. In this manner static electricity can be reduced in textiles, paper or plastic film; glass or glass fibers can be lubricated; wood pulp can be debonded; anti-self sizing or water-dispersible paper can be made; clays, pigments and other minerals can be hydrophilized; bitumen can be recovered from oil or tar sands; and petroleum can be recovered from underground wells by secondary or tertiary recovery techniques.

25 Claims, No Drawings

OXONATED POLY(ALKYLENE OXIDE) SURFACE TREATMENT AGENTS

This application is a division of application Ser. No. 767,898, filed Aug. 21, 1985 now U.S. Pat. No. 4,698,259.

This invention relates to the chemical treatment of materials carrying negative electrostatic charges with cationic solutions which are substantive to the material treated and which impart hydrophilic characteristics to such materials.

More particularly, it relates to the use of polyethers in which some or all of the ether oxygen atoms have been protonated or oxonated by a Lewis acid, i.e. reacted in such a manner as to effect covalent bonding of protons to some of the ether oxygen atoms. The resulting cationic products have many worthwhile uses and, in some cases, characteristics which are superior to conventional cationic agents.

Conventional cationic surface active agents are characterized by the fact that a hydrophobic group forms part of the cation when the compound is dissolved in water. The hydrophobic group may be alkyl, aryl, or aralkyl. The nitrogen-containing amines and quaternary ammonium salts constitute by far the largest groups of cationic surface active agents used by industry, although there is a group of nitrogenous bases including guanidines, hydrazines, amine oxide, basic nitrogen heterocyclic substances, etc., around which surface active agents also have been synthesized.

In addition to the presence of nitrogen and a hydrophobic group in the molecule, cationic agents are characterized by another property, viz., they are strongly adsorbed by surfaces which are negatively charged when wet. This latter property often results in certain advantages over anionic surface active agents, in that cationics are effective at much lower concentrations. They are exhausted from the treating solution (bath) by preferential adsorption onto various surfaces. This attraction is so great that articles may be treated with very dilute solutions of cationics. For example, a very dilute slurry of wood pulp, say 0.5 wt.% solids, may be successfully treated with a cationic debonding agent at a concentration of only about 0.25-0.5%, based on the dry weight of the wood pulp. This is a treatment which is well known to wood pulp manufacturers. The cationic, in this case, contains quarternized nitrogen and two long alkyl chains, which render it hydrophobic. (See U.S. Pat. No. 3,554,893.)

Rendering a surface hydrophobic or more resistant to wetting is not necessarily undesirable. There are, however, many instances in which it would be extremely useful if means could be found whereby a hydrophilic additive could be applied to a surface using the same mechanism that is used in the case of conventional cationic surfactants.

In the manufacture of cloth toweling, for example, quaternary ammonium salts often are applied to the yarn or the fabric to neutralize static charges that build up in them. If not neutralized, the static electricity would interfere with subsequent processing of the yarn or the woven fabric. The quaternaries may serve also to lubricate the yarn, thereby lowering the frequency of breakage. The resultant toweling, however, is less water absorbent because of the added hydrophobicity of the treating agent. Often it requires many launderings by the consumer before such towels will absorb water as well as untreated ones. Also, the presence of the long chain hydrocarbon groups can make the fabric discolored or give it a greasy feel.

I have discovered that a certain class of poly(alkylene oxide) derivatives can be used for many of the same surface treatment purposes that quaternary ammonium salts are used for, but without rendering the treated substance hydrophobic. These compounds are poly(alkylene oxides) in which one or more of the ether oxygen atoms have been oxonated with a Lewis acid. Besides being nonoleophilic, these compounds are cheaper to produce than the quaternary surfactants.

Oxonated poly(alkylene oxides) are discussed in Wurzschmitt, "Quantitative and Qualitative Analysis of Surfactants," Z. Anal. Chem. Bd. 130, 8 (1950). An oxonated ether, which may also be termed a protonated ether, can be represented thus:

This ionic configuration results from the reaction of the ether with a Lewis acid. A hydrogen proton bonds covalently with one of the unshared pairs of electrons in the oxygen atom, giving the ether a positive charge. Perst, "Oxonium Ions In Organic Chemistry," Weinheim/Bergstr., Verlag Chemie GmbH., 1971, refers to such groups as oxonium ions. The proton is supplied by the acid if a protonic acid is used. If a nonprotonic acid is used the reaction can be carried out in an aqueous medium and the proton will be supplied by the water. I believe that oxonation also can be carried out in non-aqueous media.

The presence of an oxonated ether oxygen atom in the treated poly(alkylene oxide) can be confirmed by mixing an aqueous solution of the compound with a source of a heteropolyacid anion, such as phosphomolybdic acid. If a precipitate forms, that indicates that the poly(alkylene oxide) is cationic, which, so far as I know, can only be due to its being oxonated.

The cationic character of the treated poly(alkylene oxide) can be further confirmed by an electrophoresis test carried out as follows. A drop or two of a dilute aqueous solution of the treated polyether is placed on a strip of nonwoven polyolefin fabric which is attached to two electrodes about an inch apart. A voltage (150V) is applied to the electrodes for 60 minutes, or until the current has dropped to zero. The test strip is then removed from the apparatus and drops of 1% potassium permanganate solution are applied to the fabric near each point of electrode attachment. The permanganate drops which are adjacent to the positive electrode, since they do not wet the inherently hydrophobic polyolefin, remain on the surface of the fabric. The area on the test strip next to the negative electrode becomes wettable, however, due to the presence of the positively charged moiety of the oxonate molecule, which has migrated to the negative pole. As a result, the drops of permanganate penetrate into the web at that point and stain it brown.

The presence of oxonium ions can also be detected by IR spectroscopy. An oxonated poly(ethylene oxide) under acidic conditions exhibits a peak at approximately 1730 cm$^{-1}$, which is not present in either the unoxonated poly(ethylene oxide) or the oxonating agent.

The oxonation of a poly(alkylene oxide) takes place in water at an acidic pH, i.e., a pH below the isoelectric point of the solution, e.g., within the range of about 1 to 8. A preferred pH range is about 2 to 6. While not wishing to be bound by theory, I believe that in the acidic solution the oxonated poly(alkylene oxide) actually is a cation. If the pH of the solution is brought to neutral, I believe that the cation bonds with a hydroxide ion ($OH^-$) to form a neutral dipolar oxonium compound, i.e., an ether oxonium hydroxide.

The reaction of the poly(alkylene oxide) with the Lewis acid to oxonate the ether oxygen atoms is preferably conducted at elevated temperatures, e.g., within the range of about 60° to 100° C.

The poly(alkylene oxide) may be substituted or unsubstituted, but it should be substantially devoid of substituents having hydrocarbon chains of 5 or more carbon atoms.

Preferably the alkylene groups of the poly(alkylene oxide) will have 1 to 3 carbon atoms each. The compound may be composed entirely of one species of alkylene oxide group, e.g., ethylene oxide, or it can be composed of mixed groups, e.g., a copolymer of ethylene oxide and propylene oxide. The molecular weight of the polyether preferably will be in the range of about 200 to 300,000 (weight average molecular weight). Often a molecular weight of at least 400 will be most preferred. The term poly(alkylene oxide) is sometimes used to refer only to the higher molecular weight polyethers, while the lower molecular weight compounds are referred to as polyalkylene glycols, e.g., polyethylene glycol. In this specification, however, I intend the term poly(alkylene oxide) to be generic to both types.

The Lewis concept of acids and bases is described in G.N. Lewis's "Valence and the Structure of Atoms and Molecules," New York, The Chemical Catalog Company, Inc., 1923. Simply stated, a Lewis acid is a substance which contains an atom that will act as an electron acceptor. Included within this definition are protonic (organic and inorganic) acids, e.g., mineral acids such as hydrochloric acid, sulfuric acid, and phosphoric acid, and the ammonium and metal salts of these acids. Also included are non-protonic acids such as $BF_4^-$, $AlCl_4^-$, $GaCl_4^-$, $InCl_4^{31}$, $TiCl_4^-$, $SnCl_6^{--}$, $SbCl_6^-$, $BiCl_4^-$, $FeCl_3$, and $ZnCl_3$.

The physical chemistry involved when a polyether is oxonated with a Lewis acid is exceedingly complex. When using a protonic or non-protonic Lewis acid it is sometimes advantageous to use a "promoter", e.g., a water soluble alcohol or an alkyl halide. It is generally agreed that the promoter and Lewis acid form a complex oxonium ion which serves as an intermediate in the final oxonium reaction.

With non-protonic Lewis acids (usually known as Friedel-Crafts catalysts) any one of a large group may be used with promoter compounds to protonate the polyether. The following compounds have been found to be especially suitable:

Aluminum Chloride ($AlCl_3$ or $AlCl_3.6H_2O$)
Aluminum Fluoride ($AlF_3$ or $AlF_3.3H_2O$)
Stannic Chloride ($SnCl_3$ or $SnCl_3.5H_2O$)
Aluminum Bromide ($AlBr_3$ or $AlBr_3.6H_2O$)

The preferred salts of protonic acids to use probably are the alkali metal salts, expecially sodium, and the ammonium salts. Buffered mixtures of these salts are especially useful to hold the pH within the desired limits.

The degree of oxonation of the poly(alkylene oxide) should be enough to cause it to adhere to the negatively charged substance it is used to contact. Preferably, the polyether will contain a sufficient number of oxonium groups that the electrolytic attraction between it and the negatively charged substrate will be stronger than the bond strength between the polyether and water. In this way the oxonated polyether will readily come out of solution and associate with the negative ions in the substrate. Usually it will suffice if about 0.05 percent or more of the ether oxygen atoms have been oxonated.

Substances treated by the method of the present invention should be solid, substantially insoluble in water, and should bear a negative electrostatic charge when wet with water. Examples of such materials are glass in all its various forms, various clays and pigments, sand, fibers, yarns, textiles, various cellulosic materials such as wood pulp and paper, and even human hair.

For many substances, such as textiles and other webs, the presence or absence of a negative electrostatic charge can easily be determined by means of a potentiometer. With finely divided particles other means may have to be employed. Thus, for example, one can use an electrophoretic instrument, such as a Zeta ® meter. One such device I have used is an electrophoretic instrument equipped with a 1½ inch long, clear plastic trough. Electrodes are attached to each end of the cell and connected to a direct current power supply. The cell is filled with a dilute suspension of the particulate material in water and is placed on a microscope stage, which is illuminated from below so that the suspended particles are visible through the microscope. The power (e.g., about 50 volts) is turned on and the suspended solids are viewed through the microscope. If the particles bear a negative electrostatic charge they will migrate toward the anode. Otherwise they will not move at all or will migrate toward the cathode.

I am not aware of any criticality in the concentration of the aqueous solution of the treating agent used in the method of the present invention. Usually, however, it should suffice to have an oxonate concentration in the range of about 0.002 to 5 or 10 percent, based on the weight of the water.

The treatment method of the present invention has a wide variety of applications. It can be used, for example, to reduce static electricity in textiles, paper or plastic film, to lubricate glass or glass fibers, to debond wood pulp, to make anti-self sizing paper, to hydrophilize clays, pigments, and other minerals, to make water-dispersible paper, to recover bitumen from oil or tar sands, and to recover petroleum from underground wells by secondary or tertiary recovery techniques.

The presence of electrostatic charges on many types of surfaces (paper, textiles, film, etc.) often is objectionable for several reasons. There is the bothersome electric shock which is received upon touching a metal object such as a doorknob after walking across a carpet, or the undesirable clinging effect in fabrics such as women's lingerie. Some plastic films are difficult to use or to fabricate due to a tendency of the sheets to cling together.

Then there are more serious consequences, such as sparks which might lead to an explosion or fire. The foregoing are particularly associated with man-made polymers, although under some conditions an objectionable static electric charge can be generated in natural fibers as well.

Cationic surfactants are now used with great success to treat some of these vulnerable surfaces. Unfortunately, the agents which are used have drawbacks; for example, the treated surfaces often have a greasy feel and appear to have impaired absorbency for water.

Oxonated poly(alkylene oxides) do not have these disadvantages; they are inherently hydrophilic.

When treating textile fibers by the method of the present invention, it usually will suffice to employ a treating solution concentration of about 0.025 to 10 percent of the poly(alkylene oxide), based on the weight of the water. The amount of treating solution used preferably will provide about 0.012 to 10 percent of the oxonated poly(alkylene oxide), based on the weight of the textile fibers.

The treatment of textile fibers by the present process is useful to combat static cling in wearing apparel. The treatment can be carried out in a washing machine by adding the oxonated poly(alkylene oxide) to the laundry water. Alternatively, the treating agent can be added to the damp clothes in the dryer, for example by including a sheet of paper or fabric impregnated with the agent in the dryer load.

If desired, the poly(alkylene oxide) can be oxonated in situ when using it to reduce the negative electrostatic charge on a web material, such as a textile. In situ treatment may provide a longer lasting effect. To accomplish this the web material may be sprayed, or padded with, or dipped into, an aqueous solution of the unreacted poly(alkylene oxide), taking care to assure that the solution penetrates into the interstices of the web. Then an aqueous solution of a Lewis acid is applied to the web material, also in such a manner as to reach the interstices of the material, and the wet, impregnated material is heated to a suitable temperature, e.g., about 50° to 240° C., to cause at least some of the ether oxygen atoms in the poly(alkylene oxide) to be oxonated. The temperature used should be low enough, of course, that it will not harm the web material. For that reason it will often be preferred to use a temperature within the range of about 50° to 100° C.

Before the second impregnation, the interstices of the web material must be open to penetration by the acid solution. If necessary, the material can be wrung out or dried bewteen the two impregnation steps. Drying can be partial or complete, e.g., to a water content of about 10 percent or less, based on the dry weight of the material. Drying temperatures should be low enough not to degrade the polyether, e.g., about 50° to 100° C.

Clean glass surfaces show a high degree of friction when rubbed together, and unless the surfaces are protected by a lubricant, or "finish", as it is called in the trade, the glass surfaces are easily scratched. Such surface scratches are sites of extreme vulnerability. Witness, for example, the familiar case when a pane of glass is scratched with a glass cutter and, as a result, the sheet is easily broken along the line of the surface scratch.

Similarly, and far more strikingly, this vulnerability to surface abrasion is demonstrated in glass fibers. For example, glass yarns, protected as they are by finishes, have great resistance to the effect of repeated flexing. However, upon removal of the finish, these same yarns disintegrate when flexed, and the very fine fragments of broken fiber which result from flexing are easily seen in a beam of light.

It is imperative, therefore, that glass fibers be protected from the effects of fiber-to-fiber abrasion. This is normally done by the application of lubricants to the fibers at the instant they are formed. The essential ingredients of these finishes (and without which the glass fiber industry could not have developed as it has) are cationic surfactants which are adsorbed by glass surfaces with amazing tenacity. Traditionally these cationic surfactants have had fatty alkyl chains in their structure.

To my surprise I have discovered that excellent lubrication of glass or glass fibers also can be achieved by coating the glass or the fibers with an acidic aqueous solution of an oxonated poly(alkylene oxide) as described above, even though the poly(alkylene oxide) is substantially devoid of substituents having hydrocarbon chains of 5 or more carbon atoms. The resultant finish on the glass or fibers is substantially hydrophilic, whereas the prior art finish, due to the presence of its fatty hydrocarbon chains, is substantially hydrophobic. This hydrophilic quality can provide a distinct advantage for some uses of the fibers. If the fibers are to be bonded together with a urea-formaldehyde resin, for example, which also tends to be hydrophilic, the bonding process is greatly facilitated by using my hydrophilic fibers. Preferably the treating solution will have a concentration of at least about 0.05 percent of the oxonated poly(alkylene oxide), based on the weight of the water.

The absorbent medium in disposable diapers, sanitary napkins, and the like is usually fiberized or shredded wood pulp. This product is made by taking dried pulp in the form of sheets or rolls (known as reel pulp) and disintegrating it, using hammermills or some such device, to form voluminous, soft and very water absorbent products. The pulp as received is dense and extremely strong. Very violent disintegrating forces are needed to reduce it to the desired soft, fibrous condition. This vigorous milling results in some of the fibers being reduced to dust, but even at that the product usually will be contaminated with many clumps of undisintegrated pulp. A product free from these shortcomings can be made by adding a cationic surfactant to the pulp during its manufacture. Such cationic agents interfere with the natural tendency of the pulp fibers to cohere and the resulting pulp in sheet or roll form is comparatively weak and soft and therefore can be completely fiberized so easily that very little fiber breakage occurs, i.e., the product is relatively free from dust. Fiberizing grade pulp made in this way has been used for upwards of ten years. However, dried pulp that has been treated with conventional cationic surfactants, all of which contain hydrophobic groups in their structure, does not absorb water as rapidly as untreated pulp. Many manufacturers feel that wettability is a prime reqirement in diapers, etc., so this impaired wettability is seen as undesirable for these types of uses.

I have found that the oxonated poly(alkylene oxides) described above can be used effectively as pulp debonding agents by mixing them into the pulp while in an acidic state. It is thus possible through the use of these compounds to manufacture a fluid absorbing medium free from dust and fiber clumps. Moreover, the wettability of the pulp fibers is not impaired in any way by this treatment, which is not the case with pulp which has been debonded using conventional cationic surfactants. The pH of the pulp treated by this method preferably will be in the range of about 4 to 6.

This enhancement of the hydrophilic qualities of cellulose also has applications in a variety of pulp and paper products other than disposable diapers, such as paper towels, facial tissues, etc.

While one hears most often, in connection with paper applications, of the need for greater strength when wet, there are instances where the reverse is true, as, for example, when there is a need to make disposable products, such as diapers, which can be flushed down a toilet, in which instance the cover sheet must disintegrate when immersed in water. Also, it is sometimes desirable to dispose of confidential documents rapidly, for example by chewing and swallowing. I have also found that by inclusion of a sufficient amount of the oxonated poly(alkylene oxide) in a pulp, for example 0.5 percent or more, based on the dry weight of the cellulosic material, one can produce a paper that readily disintegrates in water. Usually a treatment level of about 0.5 to 5 percent will suffice.

The process of the present invention also can be used to separate bitumen and like hydrocarbons from sand. This may be useful in recovering bitumen from tar sand or in cleaning oil spills. The hydrocarbon-impregnated sand is immersed in an aqueous solution of the oxonated poly(alkylene oxide), e.g., a solution containing about 0.05 to 10 percent of the treating agent, based on the weight of the water. Preferably the solution is heated, for example to about 30° to 100° C., and the mixture is agitated. The oxonated polyether displaces the hydrocarbon on the sand grains, allowing the hydrocarbon to be separated from the sand and recovered. The treatment of tar sand, for example, is continued long enough to allow the bitumen to separate from the sand and form a separate layer on top of the water, from whence it is recovered. For this process the alkylene groups of the poly(alkylene oxide) should have 2 or 3 carbon atoms each.

When using the process of the present invention to hydrophilize clays or pigments, it generally is preferred to treat the clay or pigment with about 0.15 to 10 percent of the oxonated poly(alkylene oxide), based on the weight of the clay or pigment. The treating solution will preferably have a concentration of about 0.05 to 10 percent of the oxonated poly(alkylene oxide), based on the weight of the water.

The present process also finds application in the secondary or tertiary recovery of petroleum from underground wells. If the oil in the producing formation is too thick to flow, or if natural driving forces are absent, other means to move the oil to the well must be employed. These may include continuous or cyclic injections of cold water, hot water, or steam in order to force the oil to flow to the well, from which it is then recovered, usually by pumping. Hot water or steam have the added advantage of reducing the viscosity of the oil, resulting in a freer flowing liquid.

As a further aid to recovery, the addition of an oxonated poly(alkylene oxide) to the water or steam effectively wets the sand particles in the oil-bearing stratum with an oleophobic molecule, thus releasing the oil from the sand and facilitating its flow to the recovery well. The temperature of the injected fluid preferably should not exceed about 260° C.

The process of the present invention is believed to be generally suitable as a substitute for the use of quaternary ammonium surfactants as anti-static agents.

The electrostatic charge induced to hair when combing after shampooing and drying often causes unmanageable fluffiness and tangles. The application of a few milliliters of the oxonated poly(alkylene oxide) completely neutralizes this charge, thus making the hair smooth and easy to comb without leaving a waxy or oily surface. Moreover, the hair remains in this condition until the next shampoo. When used as an active ingredient in hair conditioning mixtures, the oxonated poly(alkylene oxides) described herein show a decided advantage in performance and cost over those containing the usual long-chain quaternary ammonium compounds.

This invention will be better understood by considering the following examples, which are presented for illustrative purposes only.

EXAMPLE 1

Antistatic Treatment of Polyester Fabric

One gram of Carbowax ® 8000 and 0.43 g. of ammonium chloride were mixed into 20 cc. of deionized water and the mixture was heated to boiling. (Carbowax 8000 is a mixture of hydroxy-terminated polyethylene glycols ranging in molecular weight from 7000 to 9000. It has a weight average molecular weight of about 8000 and is a translucent solid at room temperature.) The amounts of reactants used provided a ratio of 8 moles ammonium chloride per 28 mole equivalents of ethylene oxide units. A clear solution resulted, believed to be a solution of polyethylene glycol in which approximately 35 percent of the ether oxygen atoms were oxonated. (When an aqueous solution of Carbowax 8000 alone was heated the polyethylene glycol rose to the surface as a separate oily layer, confirming that a chemical reaction occurred when the ammonium chloride was present.)

The solution was diluted to a concentration of 0.5 weight percent, cooled to room temperature, and applied to a piece of spun polyester fabric, designated Style No. 754, Type 54, Spun Dacron ®, obtained from Test Fabrics Inc. The fabric was scoured to remove manufacturing finishes, then it was immersed in the aqueous solution and the excess liquid then was squeezed out. The amount of the solution retained by the fabric was 114%, based on the dry weight of the fabric. Thus, the fabric was treated with 0.57% of the oxonated polyethylene glycol, based on the dry weight of the fabric. The treated fabric was then air dried at room temperature.

The treated fabric was evaluated for its ability to resist the buildup of a static charge by using a field effect transistor electrometer. A field effect transistor is normally an electrical conductor, but when a charged object is brought near one of the leads (the gate), the transistor develops a high resistivity. Use was made of this property to design an electrometer capable of detecting minute electric charges. In practice, the object being tested is exposed to the electrometer in a reproducible manner. If the object carries even a minute charge the meter of the instrument will indicate a decreased current flow. An estimate of the amount of the charge can be made by observing the time for it to dissipate, as indicated by the time required for the needle to return to its original reading. If the object is uncharged, the reading of the meter is unaffected.

In practice, a strip of fabric about one inch by 3 inches is drawn briskly between the thumb and forefinger and applied to the electrometer in a reproducible manner, and the behavior of the meter is observed. For example, an untreated sample of the polyester fabric used in this experiment caused the meter reading to drop to zero, and it did not return to its original value for 190 seconds. Before testing, the fabric was washed thoroughly to remove finishes applied by the manufacturer, and then dried.

The spun polyester fabric treated as described above with oxonated Carbowax 8000 had no effect whatsoever on the needle of the electrometer. When this treated fabric was washed it lost some of its resistance to static buildup. That is, the washed sample caused a deflection in the needle of the electrometer (showing the presence of a charge) but it returned to its original value in 10 seconds, showing that the charge dissipated in this time. As stated, the charge in the untreated sample required 190 seconds to dissipate.

EXAMPLE 2

In Situ Antistatic Treatment of Polyester Fabric

Another piece of the spun polyester fabric used in Example 1 was saturated with a 0.5 weight percent room temperature solution of Carbowax 600 in water, and the excess solution was removed by wringing. (Carbowax 600 is a mixture of hydroxy-terminated polyethylene glycols ranging in molecular weight from 630 to 750. It has a weight average molecular weight of about 600 and is a viscous liquid at room temperature.) The fabric was then dried in air at room temperature. Then it was supported in a near vertical attitude on a sheet of acrylic plastic and sprayed with a 0.5 weight percent aqueous solution of ammonium chloride. The sample was then heated in a sealed container at 95° C. for one hour; then it was dried in air at room temperature.

In order to demonstrate that the treatment is resistant to laundering, the sample was rinsed in water ten times, being wrung out after each rinse. It was then air dried.

When tested with the electrometer the sample showed it was totally resistant to an electrostatic charge buildup.

The amounts of the reagents which were used to render the treated fabric so "static resistant" were as follows:
Weight of fabric sample = 2.9 g.
Weight of Carbowax 600 = 2.9 g. × 0.005 = 0.0145 g., or 0.27 milliequivalents of -O-.
Weight of $NH_4Cl$ picked up: 3.4 g. − 2.9 g. = 0.5 g. of 5% solution = 0.0025 g. $NH_4Cl$ @ 100% or 0.0467 milliequivalents.
Degree of oxonation was 1 mole $NH_4Cl$ per 5.78 moles -O-.

EXAMPLE 3

Sizing of Glass Fibers

A length of conventional glass fiber tow was cut into one-half inch segments. Each fiber had a diameter of 0.0012 centimeter. The chopped fiber was boiled in a 10 weight percent aqueous solution of dishwashing detergent (a mixture of sodium carbonate, metasilicate, and phosphate) in order to remove the original finish, which apparently was a hydrophobic cationic surfactant. The fiber was boiled until it readily crumbled when it was rubbed between thumb and fingers, indicating it had been completely desized.

Five (5) grams of Polyox ® WSR N-10 was mixed into 20 cc. of 2.0 N hydrochloric acid and the mixture was heated to 60° C. (Polyox WSR N-10 is hydroxy-terminated poly(ethylene oxide) having a weight average molecular weight of approximately 100,000. It is a solid at room temperature.) The pH of the solution was adjusted to approximately 7 (as measured with pH paper) using 0.5 N sodium hydroxide, after which the solution was diluted with water to a concentration of 0.5 weight percent. The pH of the diluted solution was 4.7. The dissolved poly(ethylene oxide) is believed to have had approximately 35 percent of its ether oxygen atoms oxonated as a result of this treatment.

To 0.2 gm of the dried, desized glass fibers, in 100 cc of distilled water, was added 2.0 cc of the solution of oxonated poly(ethylene oxide). The suspension of fibers then was mixed in a Waring Blender at the "Stir" speed. The solution was drained off the fibers on a piece of flyscreen, following which the fibers were air dried. Another specimen of the desized fiber was treated in the same way, except that no oxonated poly(ethylene) oxide was added to the water.

Visual comparison of the two samples showed that the control sample contained many more short (broken) fibers than the one that had been sized with the oxonate. The fragile nature of the unsized fibers, as contrasted with those that were oxonate treated, was apparent when tufts of fiber were rubbed between the thumb and forefinger of each hand, thereby imparting a strong abrasive action. The unsized tuft broke down much more readily, and in the process it gave a "gritty" feel.

EXAMPLE 4

Lubrication of Glass

The following ingredients were added to a 250 ml. Erlenmeyer flask in the order listed, with swirling of the flask contents between additions:
Carbowax 8000 (5% aqueous solution): 10 ml.
5% solution of 1-chloropropane in methanol: 20 ml.
$AlCl_3.6H_2O$ (2% aqueous solution): 10 ml.
Distilled water: 60 ml.

After addition of the aluminum chloride, the mixture clouded up, and it remained cloudy after the water was added. The pH at that point was 3.53. The mixture was stoppered and placed in a 60° C. water bath for one hour, swirling occasionally. By the end of the hour a clear solution resulted. It was removed from the water bath and left to stand overnight. The final pH of the resulting aqueous solution of oxonated poly(ethylene oxide) was 3.52.

Four glass microscope slides and the outside bottom surface of a small glass test tube were all cleaned thoroughly with Bon Ami ® cleanser and water. One of the slides was submerged in the above reaction product solution for two minutes, then removed and rinsed with tap water. The slide was mounted on a table at a 45° angle and the test tube, held vertically, was rubbed down the slide with moderate pressure. The test tube moved smoothly and effortlessly.

Each of the remaining slides was treated in the same way with one of the following liquids:
A. 0.5% aqueous solution of Carbowax 8000
B. Arquad ® 2HT-75 (dihydrogenated dimethyl ammonium chloride derived from a tallow oil)
C. distilled water Slide B, which had been treated with the quaternary ammonium compound, showed the same lubricity as the slide treated with the oxonated poly(ethylene oxide). Slides A and C, however, gave considerable frictional resistance, or drag, to the movement of the test tube down their surfaces.

EXAMPLE 5

Dispersion of Titanium Oxide Pigment

A small amount (approximately 20 milligrams) of powdered titanium oxide (Titanox ® AWD anatase, water-dispersible) was mixed in a test tube with approximately 0.5 cc. of tap water at room temperature. The mixture was shaken well, then one drop of the 0.5% solution of oxonated poly(ethylene oxide) described in Example 3 was added thereto. A very stable, milk-like dispersion was obtained. The individual particles of suspended pigment were too small to be discerned when a drop of the dispersion was studied under a 60x microscope. In contrast thereto, a control of an untreated slurry of the pigment, when viewed under the same microscope, appeared to contain agglomerates of the pigment particles, clearly visible as specks in the water. When left standing, the untreated pigment settled out of suspension within a few minutes.

EXAMPLE 6

Dispersion of Bentonite

Example 5 was repeated, but using bentonite in place of the titanium oxide and ethyl alcohol in place of the tap water. The bentonite was National Standard Bl-46, 200 mesh, obtained from Baroid Division, NL Industries, Houston, Tex. The treated bentonite dispersed readily in the alcohol and remained suspended for several weeks. When an untreated control was mixed into the alcohol, there was an almost immediate separation into a clear, alcoholic upper layer and an opaque, bentonite-and-water lower layer.

EXAMPLE 7

Pulp Debonding

One gram of hydroxy-terminated poly(propylene oxide) (mol. wt. 200-450) was dissolved in 20 cc. of water, along with 5.3 cc. of 2.0N HCl. The resulting solution was heated to boiling and then allowed to cool. Then it was diluted to 100 cc. with water. The final solution contained approximately 1 wt. % of oxonated poly(propylene oxide). The pH of the solution was 1.5.

One gram of bleached Kraft pulp (Hi Brite ®, made by St. Regis Paper Company) was beaten in two cups of water in a Waring Blender for one minute at the "Stir" speed. To this was added 1.0 cc. of the oxonated poly(propylene oxide) solution prepared above. The pH of the slurry was adjusted to 4.3 with acetic acid. The slurry was diluted to about 3000 cc. and used to form a sheet of paper 4 cm. in diameter on a sheet mold. The sheet was pressed between blotters and allowed to air dry. The tensile strength of the sheet was 4.4 pounds per inch of width. An identical sheet made without the oxonate debonding agent had a tensile strength of 6.2 pounds. Thus the treatment with 1% of the oxonate (based on the dry weight of the pulp) caused a 29% reduction in strength.

The paper formed from the oxonate-treated pulp was readily fiberizable to give a fluff pulp having good absorbency properties and well suited to serve as the absorbent medium in disposable diapers.

For lack of a better term, I have referred herein to this treatment as "pulp debonding". Actually, instead of breaking chemical bonds, the oxonated poly(alkylene oxide) probably prevents fiber-to-fiber bonds from forming in the paper. It will be understood, however, that whatever the mechanism by which it is reached, I mean to refer to the effect of altering the pulp so that it, and the paper produced from it, can be fiberized more easily than if the pulp had not been treated.

EXAMPLE 8

Pulp Debonding

To 1.00 gm. of paraformaldehyde dispersed in 18 cc. of water was added $NH_4Cl$ in increments, while heating the mixture to 120°-130° F. after each $NH_4Cl$ addition. The pH of the mixture dropped to 1.1. Sufficient 0.5N NaOH was then added to raise the pH to 6.0. The unreacted paraformaldehyde was filtered off; it amounted to 0.11 gm. Thus, 0.89 gm., or 89%, of the paraformaldehyde had reacted. The filtrate was diluted with water to yield a 0.5 wt. % solution. This 0.5% solution precipitated phosphotungstic acid and migrated to the negative electrode in an electrophoresis test, showing that the reaction product was cationic. It also adsorbed onto a glass surface, thereby imparting to the glass surface a strong lubricating effect.

Another sheet of paper was made using the same procedure as in Example 7, but using 2.0 cc. of the 0.5% solution of the oxonated poly(methylene oxide), rather than the oxonated poly(propylene oxide). Thus the pulp was treated with 1% of the oxonate, based on the dry weight of the pulp. The tensile strength of the resultant sheet of paper was 2.6 pounds per inch of width, which represents a 58% reduction from the tensile strength of the control, 6.2 pounds per inch.

In this case, too, the treated pulp was very suitable for use in making a fiberized pulp for the absorbent medium in disposable diapers.

EXAMPLE 9

Pulp Debonding

Still another paper sheet was made using the procedure described in Examples 7 and 8, but using the oxonated poly(ethylene oxide) (Carbowax 8000) of Example 1. Two cc. of a 0.5 wt. % aqueous solution of the oxonate was mixed into 1.0 gm. of the pulp, which is equivalent to 1.0% of oxonate, based on the dry weight of the fiber. The tensile strength of the treated sheet was 45% of that of the untreated sheet (control). This treated sheet also was readily fiberizable to yield a superior absorbent medium.

EXAMPLE 10

Anti-Self Sizing of Wood Pulp

It is recognized in the industry that, on ageing, cellulose pulp loses its hydrophilic character, as evident from its decreased rate of water absorption. This is known as "self sizing" and is a matter of concern for those who produce paper and pulp products where the absorption rate is a property of critical importance—e.g., in paper towels, etc. In confirmation of this belief, I have found that untreated papers I have made have deteriorated greatly in their wettability as they age, but surprisingly the papers to which polyalkylene oxonates have been added retain their wettability in some cases over long periods of time. This improvement in ageing properties is demonstrated by the data in the following table:

| PAPER TREATMENT | AGE OF SAMPLE (DAYS) | ABSORPTION TIME, SECS. | % INCREASE IN ABSORPTION TIME | % INCREASE PER DAY | × 100 |
| --- | --- | --- | --- | --- | --- |
| EFFECT OF AGE ON ABSORPTION TIME | | | | | |
| None (Control) | 0 | 7 | — | — | |
| None (Control) | 51 | 15 | 114 | 2.2 | 220 |
| None (Control) | 75 | 17 | 142 | 1.9 | 190 |
| Poly(propylene oxide) oxonate from Example 6 | 37 | 8 | 13 | .35 | 35 |
| Poly(methylene oxide) oxonate from Example 7 | 465 | 10 | 42 | .09 | 9 |

EXAMPLE 11

Water Dispersible Paper

Two cc. of 2N HCl was added to 0.5 gm. of Polyox WSRN 750 resin. (Polyox WSR N-750 is hydroxy-terminated poly(ethylene oxide) having a weight average molecular weight of approximately 300,000.) The mixture was stirred with a rod. A clear viscous gel formed, which was heated to about 130° F. The gel was diluted with 8.0 cc. of water and made slightly alkaline to pH paper with 0.5N NaOH. Then enough 5% acetic acid was added to make the solution faintly acidic to pH paper. Finally, the solution was diluted with sufficient water to give a 0.5 wt. % solution of the oxonated poly(ethylene oxide).

A sheet of paper was made by the procedure used in Examples 7–9. However, instead of using a Kraft pulp, pulp of Manila hemp, a fiber much used in making strong, pliable papers, was used. One-half gram of the pulp and 5 cc. of the 0.5% solution of the oxonated poly(ethylene oxide) described above were used—i.e., 5.0% of the treating agent, based on dry fiber weight. The resulting paper sheet was pressed and air dried as before. A control sheet was made omitting the addition of the oxonated polyether.

Squares 1 cm. on a side were cut from each sheet and were immersed in water. The square made with the oxonate-treated paper disintegrated readily into its ultimate fibers with only very slight agitation. In contrast thereto, the untreated sample remained in the form of large clumps.

EXAMPLE 12

Recovery of Bitumen from Tar Sand

These tests were carried out in 3" test tubes to which a lump of Alberta tar sand (¼ the size of a pea) and about ½ cc. of test solution had been added. The tubes were placed in a rack and heated in an oven at 90° C. Several times during the heating period of 1 to 1½ hours the tubes were removed and rotated (by hand), at an angle of about 60° from vertical, to give the treating solution a chance to mingle with the lump of tar sand. The results were as shown below:

| Treating Solution | Comments |
| --- | --- |
| A. 0.5% ⅓ oxonated N-10 (Example 3) | Some oil separated and floated to the top. |
| B. 0.5% very slightly oxonated C-600 (Example 2) | Much more oil separated and floated to the top. |
| C. 0.5% highly oxonated paraformaldehyde (Example 8) | No effect; sand grains and tar remained as a solid gob. |
| D. Plain Water | No effect. |

After treatment with solutions A and B, and cooling of the test tubes, the sand in the bottom of the tubes was in the form of loose grains. When the tube was held at an angle of about 45° from vertical, and rotated, the individual sand rolled and flowed, somewhat as clean sand does.

I claim:

1. A method of reducing an electrostatic charge on textile fibers, which comprises contacting the fibers with an acidic aqueous solution of a poly(alkylene oxide) in which a sufficient number of the ether oxygen atoms have been oxonated with a Lewis acid to cause the poly(alkylene oxide) to adhere to the fibers, said poly(alkylene oxide) being substantially devoid of substituents having hydrocarbon chains of 5 or more carbon atoms.

2. The method of claim 1 wherein at least about 0.05 percent of the ether oxygen atoms have been oxonated with a Lewis acid.

3. The method of claim 2 wherein the poly(alkylene oxide) has a weight average molecular weight in the range of about 200 to 300,000.

4. The method of claim 3 wherein the alkylene groups of the poly(alkylene oxide) have 1 to 3 carbon atoms each.

5. The method of claim 4 wherein the Lewis acid is selected from the group consisting of protonic acids and the ammonium and metal salts of protonic acids.

6. The method of claim 1 wherein the poly(alkylene oxide) has a weight average molecular weight in the range of about 200 to 300,000, the alkylene groups have 1 to 3 carbon atoms each, and the solution has a concentration of about 0.025 to 10 percent of the poly(alkylene oxide), based on the weight of the water.

7. The method of claim 6 wherein the Lewis acid is selected from the group consisting of protonic acids and the ammonium and metal salts of protonic acids, the solution has a pH in the range of about 1 to 8, and the amount of poly(alkylene oxide) used is about 0.012 to 10 percent, based on the weight of the textile fibers.

8. The method of claim 7 wherein the Lewis acid is ammonium chloride and the poly(alkylene oxide) is poly(ethylene oxide).

9. The method of claim 1 wherein the fibers are in the form of a textile fabric.

10. The method of claim 9 wherein the poly(alkylene oxide) is oxonated in situ in the fabric by a) impregnating the fabric with an aqueous solution of the poly(alkylene oxide), (b) impregnating the poly(alkylene oxide)-treated fabric with an aqueous solution of the Lewis acid, and (c) heating the twice impregnated fabric to an elevated temperature sufficient to cause at least some of the ether oxygen atoms in the poly(alkylene oxide) to be oxonated by the Lewis acid, but not so high as to degrade the fabric.

11. The method of claim 10 wherein the Lewis acid is ammonium chloride and, in step (c), the twice impregnated fabric is heated to a temperature within the range of about 50° to 240° C.

12. The method of claim 11 wherein the poly(alkylene oxide) is poly(ethylene oxide) having a weight average molecular weight in the range of about 200 to 300,000.

13. The method of claim 12 wherein the poly(alkylene oxide) has a molecular weight of at least 400.

14. The method of claim 13 wherein the solution contains about 0.002 to 10 percent of the poly(alkylene oxide), based on the weight of the water.

15. The method of claim 14 wherein the solution contains about 0.05 to 5 percent of the poly(alkylene oxide), based on the weight of the water.

16. The method of claim 15 wherein the Lewis acid is selected from the group consisting of protonic acids and the ammonium and metal salts of protonic acids.

17. The method of claim 16 wherein the protonic acid is a mineral acid.

18. The method of claim 15 wherein the Lewis acid is a non-protonic acid selected from the group consisting of aluminum chloride, aluminum fluoride, stannic chloride, and aluminum bromide, and alkali metal and ammonium salts thereof.

19. Textile fibers that have been treated by the method of claim 1.

20. Textile fibers that have been treated by the method of claim 6.

21. Textile fibers that have been treated by the method of claim 7.

22. Textile fibers that have been treated by the method of claim 8.

23. A textile fabric that has been treated by the method of claim 10.

24. A textile fabric that has been treated by the method of claim 11.

25. A textile fabric that has been treated by the method of claim 12.

* * * * *

UNITED STATES PATENT AND TRADEMARK OFFICE
CERTIFICATE OF CORRECTION

PATENT NO. : 4,766.030
DATED : August 23, 1988
INVENTOR(S) : Laurence R. B. Hervey It is certified that error appears in the above-identified patent and that said Letters Patent are hereby corrected as shown below:

Column 1, line 48 "quarternized" is corrected to read -- quaternized -- ;

Column 3, line 45 $ALcl_4^-$, $Gacl_4^-$, $InCl_4^{31-}$ and $Sncl_6^{--}$, are corrected to read $AlCl_4^-$, $GaCl_4^-$, $InCl_4^-$ and $SnCl_6^{--}$; and Column 3, line 46, $Fecl_3$ is corrected to read $FeCl_3$ Signed and Sealed this Twenty-fourth Day of January, 1989

Attest:

DONALD J. QUIGG

Attesting Officer     Commissioner of Patents and Trademarks